United States Patent
Simpson et al.

(10) Patent No.: US 7,756,749 B2
(45) Date of Patent: Jul. 13, 2010

(54) SYSTEM AND METHOD FOR CHARGING FOR PRINTING SERVICES RENDERED

(75) Inventors: Shell Sterling Simpson, Boise, ID (US); Ward Scott Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2360 days.

(21) Appl. No.: 09/999,450

(22) Filed: Nov. 15, 2001

(65) Prior Publication Data

US 2003/0093324 A1    May 15, 2003

(51) Int. Cl.
*G06Q 30/00* (2006.01)
(52) U.S. Cl. .......................................... 705/26; 705/37
(58) Field of Classification Search ............ 705/26, 705/37
See application file for complete search history.

(56) References Cited

U.S. PATENT DOCUMENTS

| 4,839,829 | A  | * | 6/1989 | Freedman ................... 715/751 |
| 6,216,113 | B1 | * | 4/2001 | Aikens et al. ................. 705/34 |
| 2002/0001099 | A1 | * | 1/2002 | Okuda et al. ............... 358/1.15 |
| 2003/0140315 | A1 | * | 7/2003 | Blumberg et al. ........... 715/527 |

OTHER PUBLICATIONS

Omahoney et al., Electronic Payment Systems, published 1997, pp. 61-63.*

* cited by examiner

*Primary Examiner*—James Zurita

(57) ABSTRACT

A system and method for charging a user for printing services. In one arrangement, the system and method include the steps of receiving a debiting request from a printing service via a network, verifying privileges of the printing service to access a user account, and debiting a user account for the printing services.

12 Claims, 12 Drawing Sheets

SYSTEM AND METHOD FOR CHARGING FOR PRINTING SERVICES RENDERED

FIELD OF THE INVENTION

The present disclosure relates to a system and method for charging for services. More particularly, the disclosure relates to an imaging system and method with which a user account can be debited for printing services that have been rendered to the user.

BACKGROUND OF THE INVENTION

As computer technology has advanced, the role of computers in our daily lives has expanded, as has the need for various peripheral or supporting devices. One typical peripheral device used with computers is a printer, which generates hard copies of electronic data. The types and capabilities of available printers have similarly been expanding, resulting in a wide variety of printers with a range of printing capabilities, performance, and price.

One significant expansion in the use of computer technology is the networking of computers. Networking computers together allows the computers to communicate with one another as well as with other devices, such as printers. As computer networks, such as the Internet, continue to develop, there is increasing demand for additional and improved functionalities that draw upon and exploit the full computing potential of computer networks.

One area in which such networking could be used is account billing. For example, copy and printing centers typically accommodate pay printing by allowing users to print a document to a controlled printing device, pick-up the document at a check-out counter, and pay for the printed document based upon its length and/or other attributes. Such an arrangement is common, for instance, on campus copy/printing centers. More desirable, however, would be a system and method that is more automated and therefore more convenient for the user. For example, a system and method that allows for a walk-up service would be very convenient for users.

SUMMARY OF THE INVENTION

The present disclosure relates to a system and method for charging a user for printing services. In one arrangement, the system and method comprises the steps of receiving a debiting request from a printing service via a network, verifying privileges of the printing service to access a user account, and debiting a user account for the printing services.

The present disclosure further relates to a printing device. In one arrangement, the printing device comprises memory including logic configured to receive a debiting request from a printing service via a network, verify privileges of the printing service, and debit the user account for the printing services rendered by the printing service.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed is a system and method for debiting an account in a pay-for-printing scenario. Generally speaking, the system has a distributed architecture with which a user can maintain imaging data to be added to a printed document in a personal imaging repository. In a preferred arrangement, the user can access a network-based or web-based printing service that enables the user to access the imaging data in the user's personal imaging repository and, if desired, generate one or more hard copy documents in exchange for payment of a fee. The fee is paid through access of a purchasing service by the printing service. More particularly, the printing service accesses the purchasing service to debit a user account for the printing services that have been rendered.

To facilitate description of the inventive system and method, example systems are discussed with reference to the figures. Although these systems are described in detail, it will be appreciated that they are provided for purposes of illustration only and that various modifications are feasible without departing from the inventive concept. After the description of the example systems, examples of operation of the systems are provided to explain the manners in which business cards can be produced.

Figure 1:
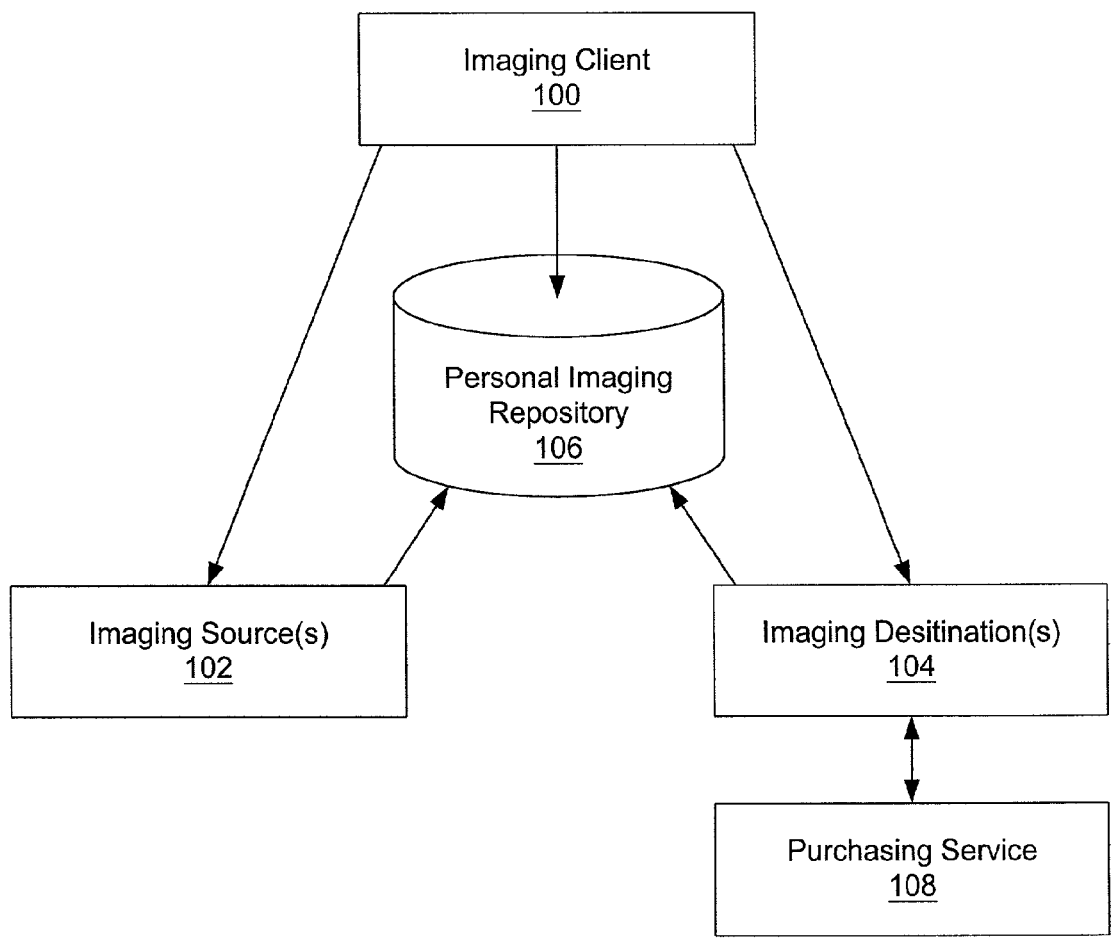
FIG. 1 is a schematic representation of the general operation of the invention.

FIG. 1 is a schematic representation of the general operation of the invention. As shown in this figure, an imaging client 100 communicates with one or more imaging sources 102, one or more imaging destinations 104, and a personal imaging repository 106. The imaging source(s) 102 represent any of a wide variety of devices/services that can be accessed by the imaging client 100 and used to select or identify imaging data to be used to create a document.

The personal imaging repository 106 provides image storage facilities that typically are personalized for the individual imaging client 100. The imaging repository 106 can be located in various different places. For example, the repository 106 can be maintained on one or more computing devices associated with the imaging client 100, imaging source(s) 102, or imaging destination(s) 104. Alternatively, the repository 106 can be maintained on a separate computing device (e.g., server) that the imaging client 100, imaging source(s) 102, and imaging destination(s) 104 can access. The imaging data in the imaging repository 106 can be any type of printable data, such as text, graphics, frames of video or animations, pictures, combinations thereof, and so forth.

Once imaging data is stored in the personal imaging repository 106, the imaging client 100 can select data from the repository that is to be communicated to the imaging destination(s) 104 for some form of processing or manipulation. By way of example, the data are communicated to the image destination(s) 104 for printing. Where the imaging destination(s) 104 are adapted for printing, they may comprise any of a wide variety of printing devices that are capable of generating hard copy documents, such as printers, multifunction peripherals (MFPs), plotters, services managing printing devices, and so on. Where printing is provided as a pay service, the imaging destination(s) 104 can access a purchasing service 108 and, thereby, debit a user account for the printing that was conducted.

As will be apparent from the discussions that follow, the above-described manner of operation provides a high degree of personalization to the imaging client 100. Specifically, in that the client's personal information can be accessed and utilized with any participating service (e.g., web site) used by the client, each service can be customized for the user.

Figure 2:
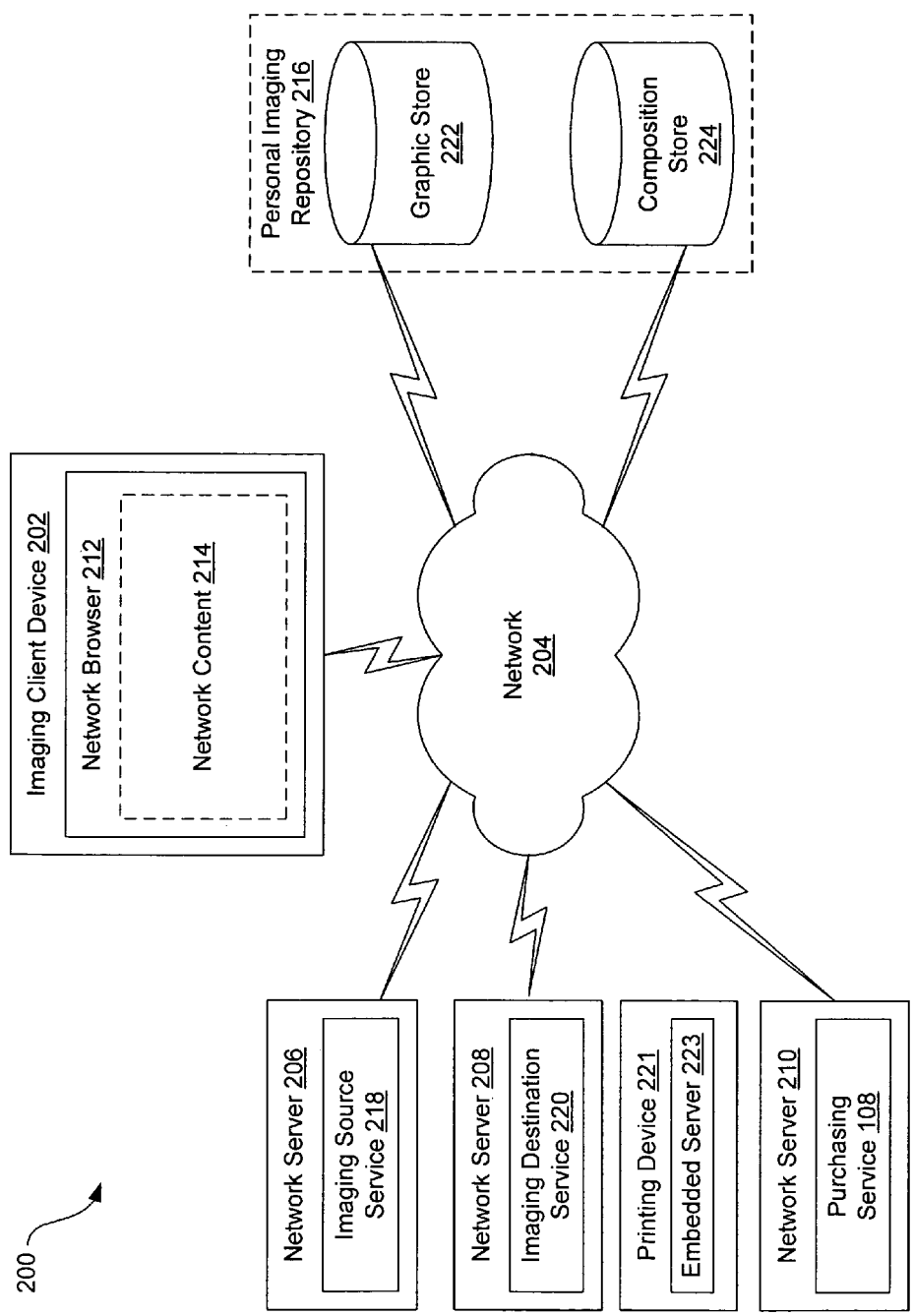
FIG. 2 is an example distributed system in which the invention can be implemented.

FIG. 2 illustrates an example distributed system 200 in which the invention can be implemented. As indicated in FIG. 2, the system 200 includes an imaging client device 202 that is coupled to a network 204. Through this coupling, the imaging client device 202, and therefore the imaging client (i.e., user), can be placed in communication with one or more network servers, such as servers 206, 208 and 210. The client device 202 and network servers 206, 208, and 210 represent any of a wide variety of conventional wired and/or wireless computing devices, such as desktop computers, portable computers, dedicated server computers, multi-processor computing devices, personal digital assistants (PDAs), mobile telephones, pen-based computers, gaming consoles, and so forth.

The network 204 represents one or more data distribution networks that can be used to communicate data and other information (e.g., control information) between or among various computing devices. Examples for the network 204 include the Internet, a local area network (LAN), a public or private wide area network (WAN), and combinations thereof. The network 204 can further include various different types of networks, including wired and/or wireless portions, employing any of a wide variety of different communications protocols including public and/or proprietary communications protocols.

During operation, the user can operate a network browser 212 executing on the imaging client device 202 to interact with imaging services 218 and 220 executing on the network servers 206 and 208 as well as the purchasing service 108, which executes on the network server 210. As used herein, the term "services" refers to software and/or firmware components that can execute on one or more computing devices and which provide one or more particular functionalities to the imaging client device 202 such as imaging data selection and arrangement, data manipulation, printing, and so forth. As indicated in FIG. 2, the network browser 212 can receive network content 214 from one or more of the network servers 206, 208, 210. This content 214 typically includes various components such as, for example, text, graphics, and various commands (e.g., hypertext mark-up language (HTML), Java™, JavaScript™, etc.) and/or applications (e.g., Java™ applets). In use, the content 214 can, in some arrangements, facilitate communication with a personal imaging repository 216 so that the servers 206 and 208 can access data stored in the repository. Examples of the ways in which this communication can be facilitated are described below with reference to FIGS. 3 and 4.

The network server 206 executes an imaging source service 218 that, among other things, allows the user to interact with his or her personal imaging repository 216. The imaging source service 218 may actually provide multiple services that can be accessed. In some embodiments, these different services can provide different functionalities. For instance, one service may be responsible for graphic storage and retrieval while another service may be responsible for merging graphics in a single document. By accessing these services with the network browser 212, the user can select or identify imaging data that are to be stored as graphics in a graphic store 222 of the personal imaging repository 216. These graphics can be stored as individual files and generally can comprise any data capable of being represented as a two dimensional graphic. As is discussed below, the individual graphics in store 222 can be used as individual images that can be printed on appropriate print media, or multiple individual graphics can be compiled together as a single image for printing.

Irrespective of whether multiple graphics are to be used, the imaging source service 218 can be used to arrange the graphic(s) on a visual representation of a document to be created. Once the arrangement has been selected, the imaging source service 218 can store the arrangement as a composition (i.e., a composition image) in a composition store 224 of the personal image repository 216. It is to be noted that, although the graphic store 222 and the composition store 224 are illustrated as two separate stores, multiple such stores may exist in the system 200 and one or more graphic stores may be combined with one or more composition stores. Additionally, one or more of these stores 222 and 224 may be implemented on the imaging client device 202, one or more of the servers 206, 208, or 210 or another designated computing device (not shown).

Once the graphics and composition have been selected, the image data can be processed or otherwise manipulated by accessing an imaging destination service 220 that executes on the network server 208. Where one or more hard copy documents are to be generated, this service 220 can comprise a print service with which the document(s) can be printed. In such a scenario, a print request is communicated to the imaging destination service 220 and, upon receipt of the print request, the network server 208 interacts with the graphic store 222 and composition store 224 to retrieve the data needed to complete the print job. Once these data are retrieved, the network server 208 interacts with one or more printing devices (221) to which the server is coupled (directly or indirectly) to generate the hard copy document(s).

Assuming the print job is successfully completed, the imaging destination service 220 can access the purchasing service 108 to, thereby, debit the applicable user account. This process is discussed in greater detail below with reference to FIGS. 8 and 10.

Figure 3:
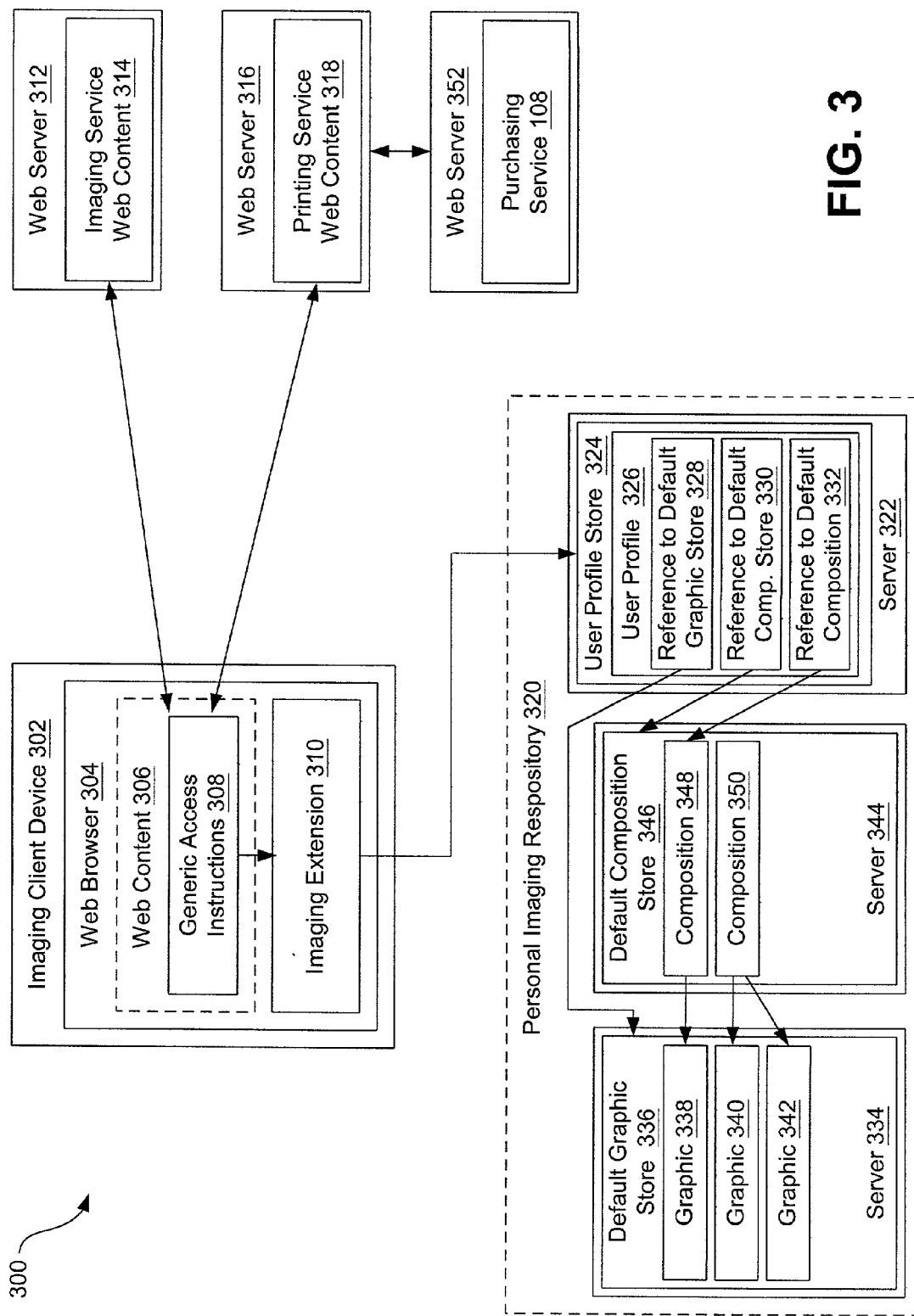
FIG. 3 is a first example web-based imaging system in which the invention can be implemented.

FIG. 3 illustrates a first example web-based imaging system 300 in which the invention can be implemented. As will be appreciated from the discussion that follows, this system 300 can be described as a client-based implementation in that much of the system functionality is provided by a client device. A similar system is described in detail in U.S. patent application Ser. No. 09/924,058, entitled "A Method, System and Program Product for Multiprofile Operations and Expansive Profile Operation," by Shell Simpson, Ward Foster, and Kris Livingston, the disclosure of which is hereby incorporated by reference into the present disclosure.

As indicated in FIG. 3, the system 300 includes an imaging client device 302. The imaging client device 302 comprises a web browser 304 that is adapted to access web content 306 derived from imaging service web content 314 and printing service web content 318 of web servers 312 and 316, respectively. The web content 306, like content 212, typically comprises text, graphics, and various commands. The commands can comprise one or more sets of executable instructions that are downloaded into the browser 304 to perform a service requested by the user. These instructions can be written in any suitable language including, for instance, HTML, Java™, JavaScript™, C-sharp, or other appropriate language. A variety of different functionalities can be served by the executable instructions. For example, the web content 306 normally includes executable instructions for causing target graphics, i.e. graphics provided by an accessed web site, to be displayed to the user.

In the embodiment shown in FIG. 3, the executable instructions are further used to access a personal imaging repository 320. These instructions typically comprise system-wide generic access instructions 308 that call on methods of an imaging extension 310 to access the personal imaging repository 320 and perform various web imaging operations. These instructions 308 are designated as "generic" because they are independent of the configuration of the user's personal imaging repository 320. As is discussed in greater detail below, the generic access instructions 308 can be used to, for example, add a graphic to a default graphic store 336 of the personal imaging repository 320, or add a new composition to a default composition store 346 of the repository.

As is further indicated in FIG. 3, the imaging extension 310 can form part of the browser 304. Although this arrangement is shown in the figure and described herein, the imaging extension 310 can, alternatively, be provided outside of the browser 304, for instance on a different device. Irrespective of its location, however, the imaging extension 310 is configured to respond to the execution of the generic access instructions 308 by generating/mapping to corresponding imaging client specific commands of the user. The imaging extension 310 typically is implemented as one or more application programming instructions (APIs) that, preferably, act as interfaces in accordance with a system-wide standard.

When executed, the generic access instructions 308 cause imaging extension calls (e.g., API calls) to be issued which, in turn, cause the imaging extension 310 (e.g., APIs) to access to the user's personal imaging repository 320. The web content 306 therefore uses the imaging extension 310 as a gateway to access the user's personal imaging repository 320. Generally speaking, the APIs can comprise sets of methods for establishing a destination for redirecting the browser 304 based on some form of received redirection initiation. In such circumstances, the process normally comprises receiving a redirection initiation to redirect the browser 304, retrieving a direct or indirect reference to a destination, and then causing the browser to browse to that destination. It will be recognized that there are many other ways (both in hardware and software) to implement this same functionality.

In some arrangements, the imaging extension 310 is configured to prevent the web content 306 (i.e., the executable instructions from one or more web services), from arbitrarily accessing the user's personal imaging repository 320. This restricted access can be imposed upon the web content 306 using a variety of methods. For example, an imaging extension API can be configured to only accept references from the web content 306 that were previously provided by the imaging extension 310. In such a scenario, the content 306 cannot arbitrarily supply references when calling the imaging extension API. Therefore, in order to access the user's personal imaging repository 320, the web content 306 must first obtain references using the imaging extension API.

The imaging extension 310 can be used to access one or more user profiles 326 that is/are stored in a user profile store 324 of a server 322 of the personal imaging repository 320. By way of example, the imaging extension 310 can be directed to the user profile 326 with a uniform resource locator (URL), pointer, socket, or other backroom detail. In some embodiments, the same user can have multiple user profiles. This may be particularly advantageous when a firewall (not shown) is used in that different graphic stores and composition stores can be used depending on whether the user is inside or outside of the firewall.

The user profile 326 typically includes references to all or a portion of the personal imaging repository 320 for that user profile. For instance, as shown in FIG. 3, the user profile 326 can include a reference 328 to a default graphic store, a reference 330 to a default composition store, and a reference 332 to a default composition. In addition, as is discussed below, the user profile 326 can include information used for billing purposes when pay services are used with the system 300. For instance, the user profile 326 can include a URL, pointer, socket, or other backroom detail that identifies the location of a user account that is to be debited when pay services are used by the user.

In use, the user profile 326 functions as a service that uses appropriate methods to create, modify, access, and cancel profiles. Accordingly, the imaging extension 310 maps to the appropriate methods (i.e., makes use of the methods) in the user profile 326 to obtain the reference to various repository items such as the default graphic store 336 and the default composition store 346.

Like the user profile store 324, the default graphic store 336 and default composition store 346 can reside on separate servers 334 and 344. It will be understood, however, that one or more of the stores could reside on a single machine, if desired. As indicated in FIG. 3, the default graphic store 336 is used to store various graphics, such as graphics 338, 340 and 342. These graphics can be stored in substantially any format. For example, these formats can comprise PDF, JPEG, PostScript, TIFF, GIF, BMP, etc. In addition, the default graphic store 336 can include one or more APIs. Therefore, in contrast to merely providing for graphic storage, the graphic store 336 can also provide services used to create, retrieve, and/or manipulate graphics. Furthermore, the default graphic store 336 can communicate with the web content of various web services. For example, printing service web content 318 can submit queries to the default graphic store 336 (via the extension 310) about a print job as well as request that one or more graphics be transmitted in a desired arrangement to optimize printing performance.

The default composition store 346 stores various compositions, such as compositions 348 and 350, which can be used to arrange the selected graphics. Like the user profile store 324 and default graphic store 336, the default composition store 346 can also comprise various APIs that can access graphics from the graphic store, manipulate the graphics, etc.

In addition to the components described above, the system 300 can include a web server 352 that executes the purchasing service 108, which is accessible over a network such as the Internet. As is discussed in greater detail below with reference to FIGS. 8 and 10, the purchasing service 108 can be accessed by other services, such as a printing service executing on web server 316, so that the user can be charged for services (e.g., printing services) that have been provided. For instance, printing services request debiting of a user account for printing services that have been rendered to the user.

Figure 4:
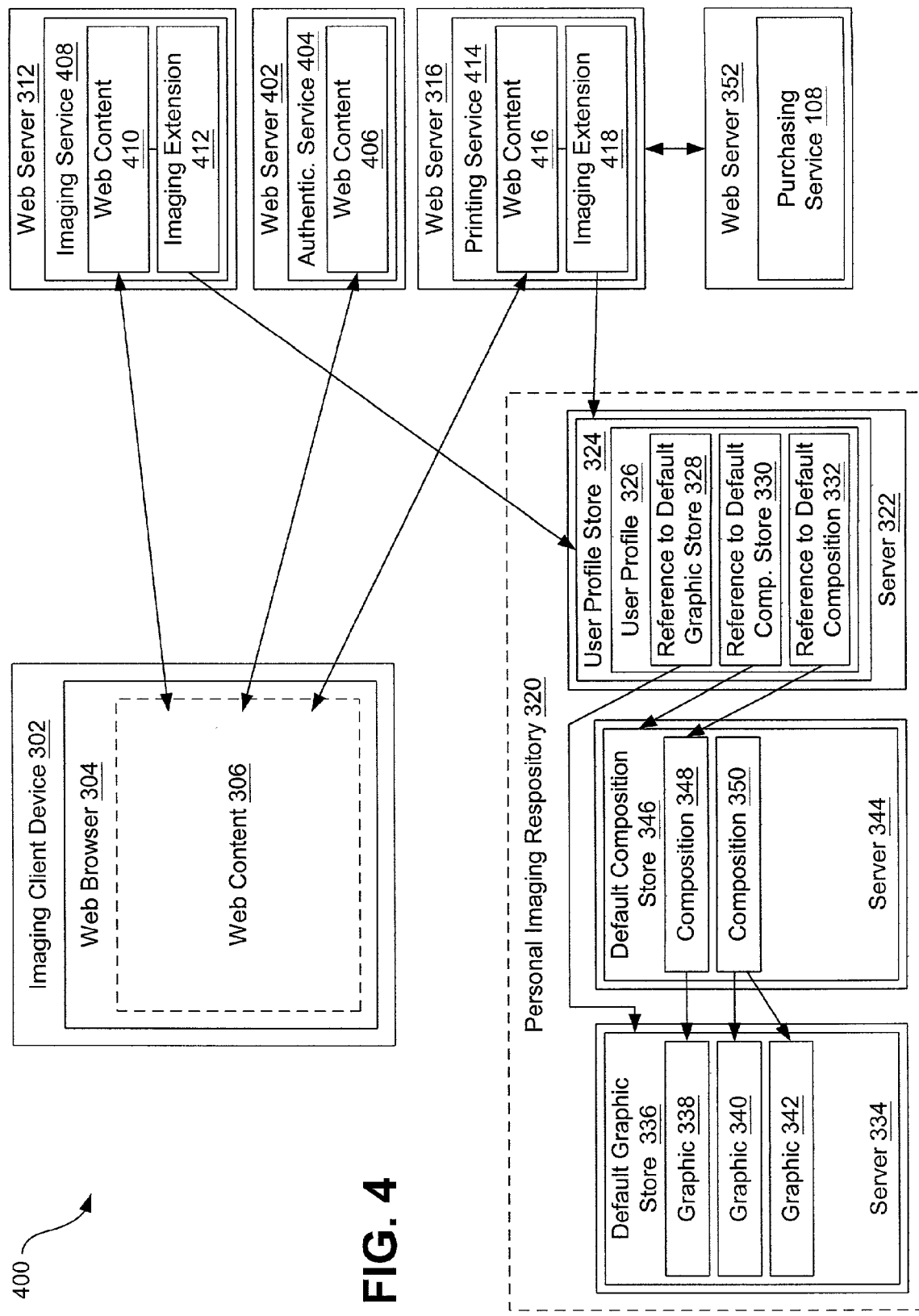
FIG. 4 is a second example web-based imaging system in which the invention can be implemented.

FIG. 4 illustrates a second example web-based imaging system 400 in which the invention can be implemented. As indicated in FIG. 4, the system 400 includes many of the features of the system 300 shown in FIG. 3. Therefore, the system 400 includes an imaging client device 302 that executes a web browser 304 to receive web content 306. The system 400 also includes a personal imaging repository 320 that can, for instance, comprise a user profile store 324, a default graphic store 336, and a default composition store 346. Furthermore, the system 400 includes web servers 312, 316, and 352. Each of these components is generally configured in similar manner as the like-named and numbered features identified in FIG. 3. However, unlike the client-based system 300, the system 400 provides a server-based implementation in which much of the functionality provided by the client device 302 in the system 300 is transferred to another device. By way of example, this other device can comprise a further web server 402, which executes an authentication service 404. As shown in FIG. 4, the authentication service 404 comprises web content 406 (e.g., generated on the fly) that can be downloaded into the user's browser 304.

In addition to the above-noted differences, the servers 312 and 316 are provided with different software in the system 400 to permit alternative modes of operation. By way of example, the web server 312 can execute an imaging service 408, which includes web content 410 and an imaging extension 412. Similarly, the web server 316 can execute a printing service 414, which includes web content 416 and an imaging extension 418. Like the web content 314 and 318 of the system 300, the web content 410 and web content 416 typically comprise text and graphics that can be downloaded into the user's browser 304. Unlike the system 300, however, generic access instructions need not be downloaded into the browser 304 in that the browser does not comprise its own imaging extension. Such an arrangement is advantageous where the client device 302 has limited storage capacity (e.g., for PDAs, mobile telephones). Instead, as identified above, the services 408 and 414 include their own imaging extensions 412 and 418 that can be used to access the user's personal imaging repository 320. By way of example, the content 410 and 416 comprise server-side code including one or more of PHP script, Java™ Servlets, Java™ server pages (JSPs), active server pages (ASPs), etc.

Each of the imaging extensions 412 and 418 typically has configurations that are similar to that of the imaging extension 310. Therefore, the imaging extensions 412 and 418 can comprise one or more APIs that, when executed, access to the user's personal imaging repository 320. Again, the APIs can comprise sets of methods for establishing a destination for redirecting the browser 304 based on some form of received redirection initiation. The APIs can implement, for instance, a URL, pointer, socket, or other backroom detail to facilitate the redirection.

The manner in which the personal imaging repository 320 is accessed by the services in the system 400 will now be discussed with reference to an example scenario. In this example, the user browses to the imaging service 408 using the web browser 304 of the client device 302. Upon reaching the service 408, web content 410 is executed to generate web pages that are downloaded to the web browser 304 (as content 306). Once this occurs, the browser 304 is redirected by the content 306 to the authentication service 404 that resides on the web server 402. Typically, this is accomplished by the web content 410 by generating a hypertext transfer protocol (HTTP) redirect that, when downloaded to the browser 304, causes the browser to redirect to an address (e.g., URL) identified in the header entry. Web content is then downloaded to the web browser 304 and the user is provided with an opportunity to complete an authentication procedure that identifies both the user's identity and the location of the user's personal imaging repository 320. The authentication procedure can, for example, comprise entry of authentication information, such as a user name and password, that has been registered with the authentication service 404, for example, in a previous session. This information can be entered in a web page generated by the server 402. In an alternative arrangement, the authentication procedure can comprise the reading of a user identification card, which includes storage media (e.g., magnetic strip) that contains the user's authentication information. Persons having ordinary skill in the art will recognize that many other authentication alternatives exist.

Once the authentication procedure is successfully completed by the user, the browser 304 is again redirected, this time back to the imaging service 408. The redirection address (e.g., URL) used to revisit the imaging service 408 contains information that identifies the user and information identifying the user's personal imaging repository 320 (e.g., with a further URL). To avoid continual redirection back and forth, a "cookie" can be stored on the client device 302 that permits the authentication service 404 to validate the user's identity without requiring a further log in. Once this information is possessed by the imaging service 408, the service can, when appropriate, make calls to its imaging extension 412 (e.g., API calls) to command the imaging extension to access the user profile store 324 of the personal imaging repository 320. Through this access, the imaging service 408 can be used by the user to, for instance, select or identify imaging data to be stored as graphics in the default graphic store 336.

When the printing service 414 is accessed, for example through redirection from the imaging service 408 when a "print" button is selected, various content is downloaded to the web browser 306. The printing service 414 can then access the default graphic store 336 and default composition store 346 such that the graphics to be printed can be accessed and their arrangement on the document obtained.

Figure 5:
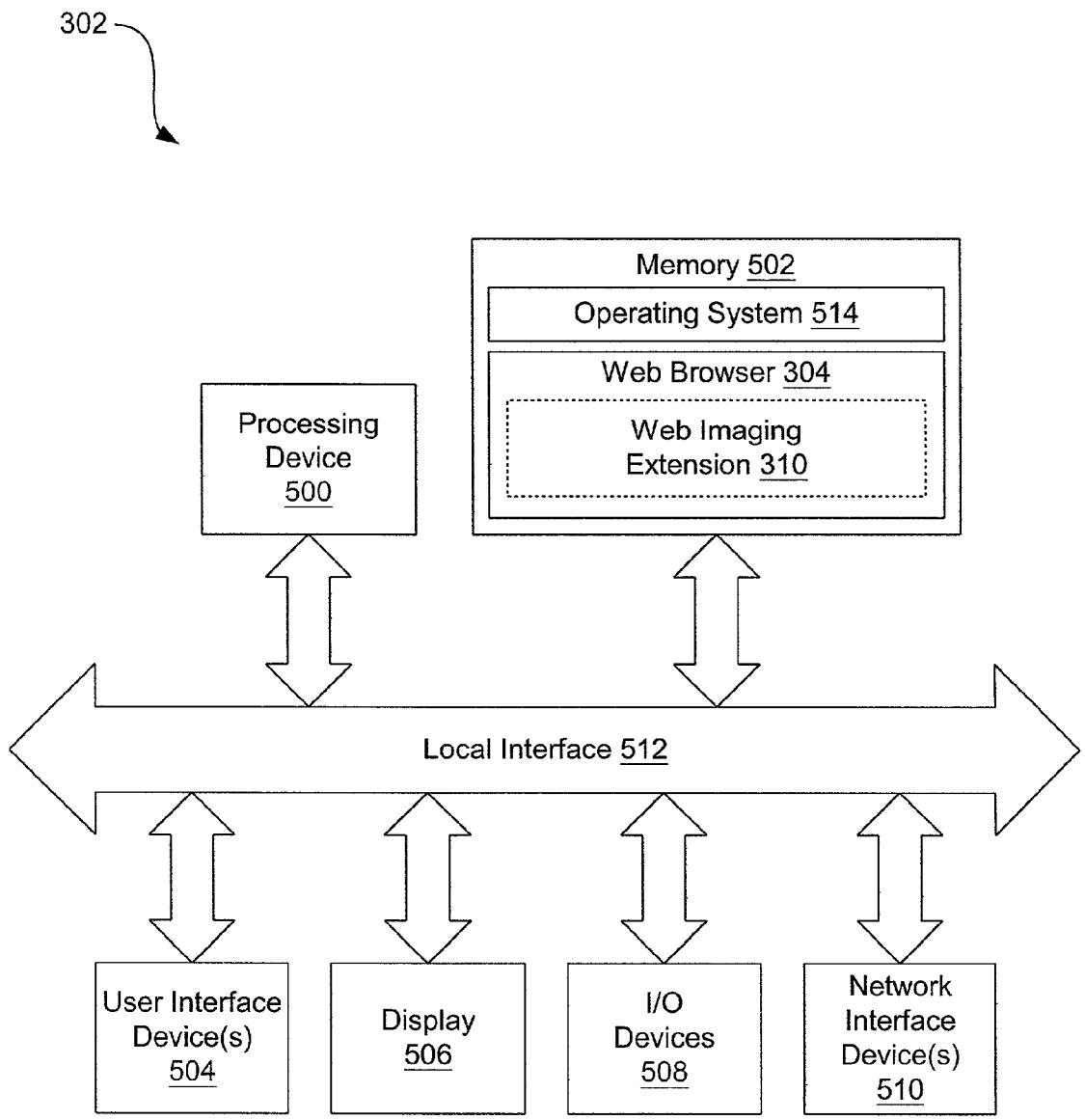
FIG. 5 is a schematic of an imaging client device shown in FIGS. 3 and 4.

FIG. 5 is a schematic view illustrating an example architecture for the imaging client device 302 identified in FIGS. 3 and 4. As identified above, the client device 302 can be any one of a wide variety of conventional wired and/or wireless computing devices, such as desktop computers, portable computers, dedicated server computers, multi-processor computing devices, cellular telephones, PDAs, handheld or pen-based computers, gaming consoles, and so forth. Irrespective its type, the client device 302 typically comprises a processing device 500, memory 502, one or more user interface devices 504, a display 506, one or more input/output (I/O) devices 508, and one or more networking devices 510, each of which is connected to a local interface 512.

The processing device 500 can include any custom made or commercially available processor, a central processing unit (CPU) or an auxiliary processor among several processors associated with the client device 302, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the client device 302. The memory 502 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 504 comprise those components with which the user can interact with the client device 302. For example, where the client device 302 comprises a personal computer (PC), these components can comprise a keyboard and mouse. Where the client device 302 comprises a handheld device (e.g., PDA, mobile telephone), these components can comprise function keys or buttons, a touch-sensitive screen, a stylus, etc. The display 506 can comprise a computer monitor or plasma screen for a PC or a liquid crystal display (LCD) for a handheld device.

With further reference to FIG. 5, the one or more I/O devices 508 are adapted to facilitate connection of the client device 302 to another device and may therefore include one or more serial, parallel, small computer system interface (SCSI), universal serial bus (USB), IEEE 1394 (e.g., Firewire™), and/or personal area network (PAN) components. The network interface devices 510 comprise the various components used to transmit and/or receive data over a network (e.g., network 204 in FIG. 2). By way of example, the network interface devices 510 include a device that can communicate both inputs and outputs, for instance, a modulator/demodulator (e.g., modem), wireless (e.g., radio frequency (RF)) transceiver, a telephonic interface, a bridge, a router, network card, etc.

The memory 502 normally at least comprises an operating system 514 and a web browser 304. The operating system 514 controls the execution of other software and provides scheduling, input-output control, file and data management, memory management, and communication control and related services. As noted above with reference to FIGS. 3 and 4, the web browser 304 comprises software and/or firmware that is used to access various services over a network (e.g., Internet) and, therefore, download content from various different sources. Where the web browser 304 is configured as indicated in FIG. 3, the browser can comprise an imaging extension 310. However, it will be understood that where the system is arranged as indicated in FIG. 4, the imaging extension 310 need not be provided in the browser 304.

The architecture of the various servers shown in FIGS. 3 and 4 are typically similar to that described above with reference to FIG. 5. Therefore, separate figures are not provided for these servers. Regardless, however, persons having ordinary skill in the art will recognize the various different architectures that could be used for the construction of the servers.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, operation of the systems will now be discussed. In the discussions that follow, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 6:
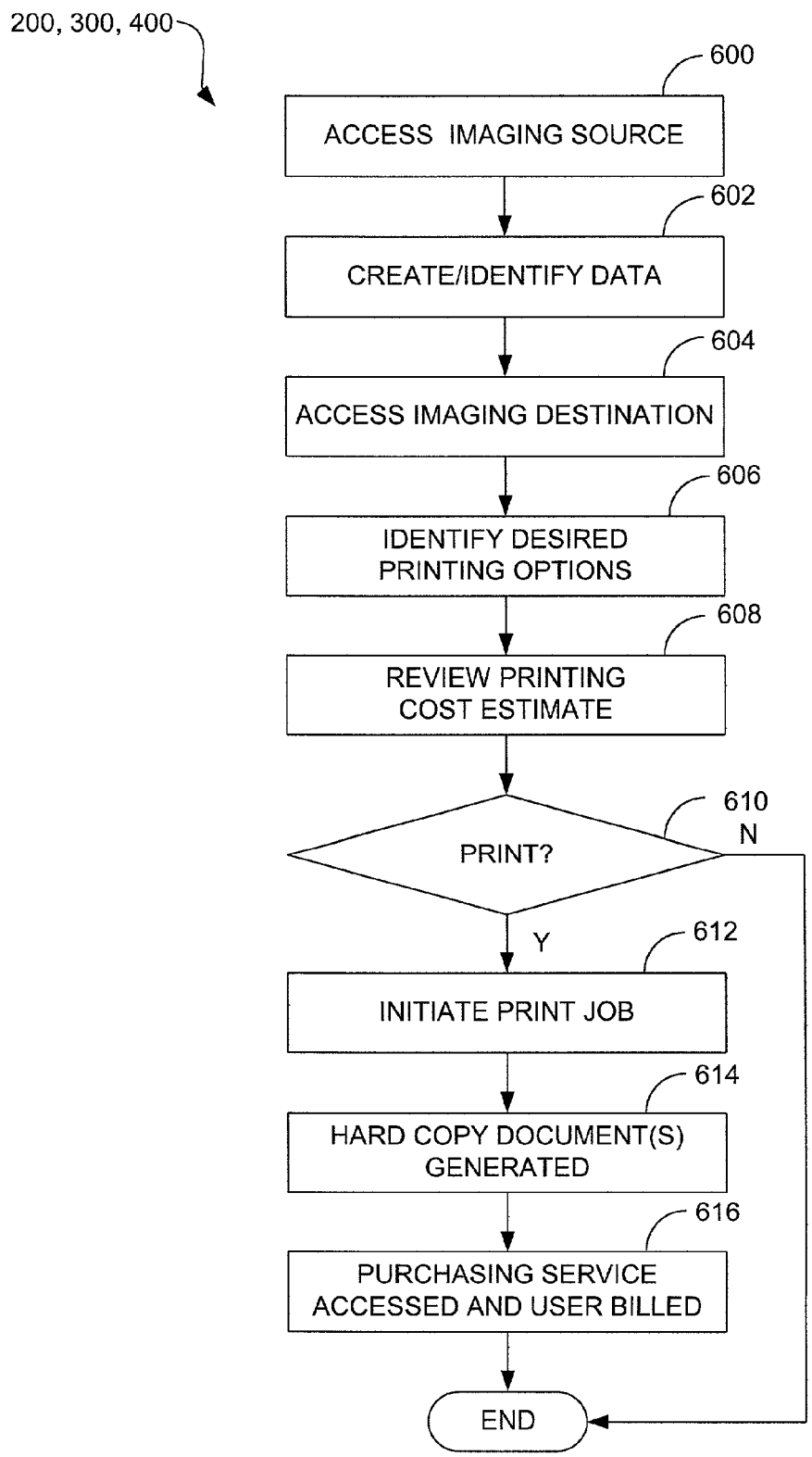
FIG. 6 is a flow diagram that provides an overview of the manner in which the account can be debited in a pay-for-printing scenario.

FIG. 6 provides an overview of an example manner in which debiting of an account for printing services rendered can be achieved. As indicated in block 600, an imaging source 102 is first accessed by the user. Once the service is accessed, the user creates or identifies data that are to be used to generate one or more hard copy documents, as indicated in block 602. By way example, data can be created/identified with a suitable user application, such as a word processing application. Where the data are created by the user, the user may further select the arrangement (i.e., composition) of the data. Notably, the data may include text as well as one or more graphics.

At this point, an imaging destination 104 can be accessed, as indicated in block 604, so that hard copy documents can be created. By way of example, the imaging destination 104 comprises a network-based (e.g., web-based) pay-for-printing service that includes one or more remote printing devices and/or that facilitates printing on one or more printing devices proximate to the user. Once the imaging destination 104 is accessed, the user can identify the printing options he or she desires, as indicated in block 606. For example, the user can identify the number of copies to be printed, the type of print media (e.g., paper) to be used, etc.

After the desired options have identified, the system determines the cost of the proposed print job so that, as indicated in block 608, the user can review a printing cost estimate. Referring next to decision element 610, it can be determined whether the user, after receiving the estimate, wishes to print. If not, flow for the session is terminated. If printing is desired, however, the user initiates the print job with the imaging destination 104, as indicated in block 612, and one or more hard copy documents are generated, as indicated in block 614. Once the document(s) has/have been successfully printed, the pay-for-printing service can access the purchasing service 108 to facilitate debiting of an applicable user account, as indicated in block 616. At this point, flow for the printing/billing session is terminated.

Figure 7:
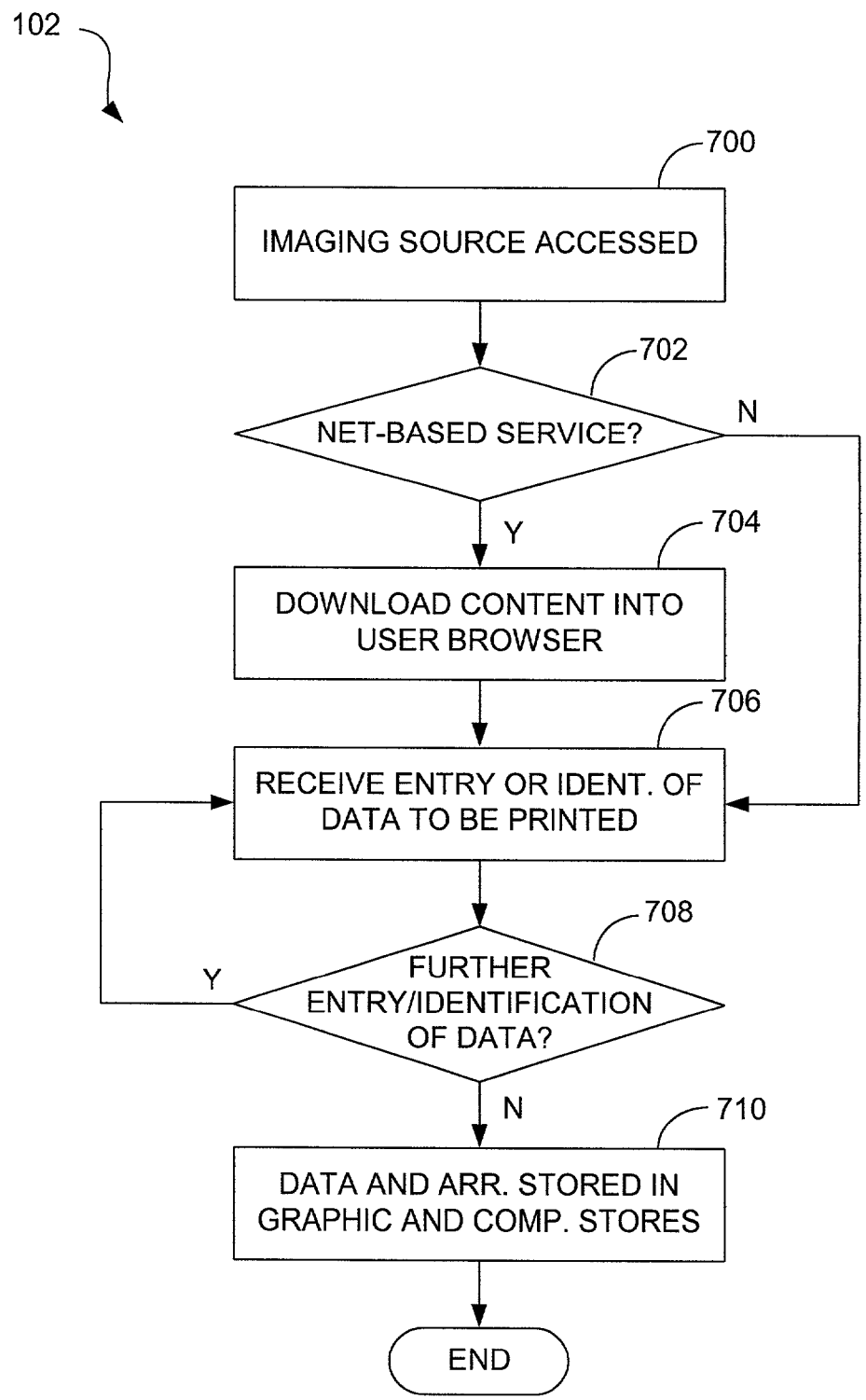
FIG. 7 is a flow diagram of an example of using an imaging source to create and/or identify data to be printed.

Referring now to FIG. 7, an example of use of an imaging source 102 to create and/or identify data to be printed is provided. The imaging source 102 can have various different arrangements. By way of example, the imaging source 102 can simply comprise a local application (e.g., word processing application) that executes on the client device 302. In another example, the imaging source 102 can comprise a network-based (e.g., web-based) service with which data can be created, identified, and/or arranged by the user. Where the imaging source 102 comprises a network-based service, the user may access the source with a user browser 304. In such a scenario, the service typically comprises a web site that is accessed via the Internet.

Irrespective of its configuration, the imaging source 102 is first accessed by the user, as indicated in block 700. The operation from this point forward may, however, depend upon whether the imaging source 102 is a local application or a network-based service. Referring to block 702, if the imaging source 102 is not a network-based service, flow continues down to block 706 described below. If, on the other hand, the imaging source 102 is a network-based service, flow continues to block 704 at which the imaging source 102 downloads content 306 into the user browser. As noted above, this content 306 normally includes various text and/or graphics that are displayed to the user to facilitate interfacing between the user and the service. As described above with reference to FIG. 3, this content 306 can, optionally, include generic access instructions 308 that call on methods of an imaging extension 310 of the browser 304 to perform various web imaging operations.

After the imaging source 102 has been accessed, the source can receive entry or identification of data (i.e., graphics), as indicated in block 706. For example, the imaging source 102 can receive data manually entered by the user via the user interface devices 504 of the client device 302. Alternatively, the user can identify the location of data (e.g., a formerly created document) that resides in memory 502 of the client device 302 or in a network-accessible location remote from the device memory. Once the data have been received and/or identified, it can be determined whether further data are to be entered and/or identified, as indicated in decision element 708. If further data are to be entered and/or identified, flow returns to 706 at which these data are received. If no further data are to be entered and/or identified, however, flow continues on to block 710 at which the received data, as well as the arrangement (i.e., composition) of the data, are stored within the personal imaging repository 320. More specifically, the data can be stored within the graphic store 336 and the arrangement of the data can be stored within the composition store 346. Although the data and arrangement (i.e., imaging data) have been described as being stored in separate "stores," persons having ordinary skill in the art will appreciate that the data and their arrangement could be stored within a single "store."

Where the imaging source 102 is a network-based service, storage of the imaging data can be facilitated through use of the imaging extension 310 stored in the user browser 304 and/or an imaging extension 412 stored on web server 408. In the former case, the content 306 downloaded to the browser 304 makes a call (e.g., API call) to the imaging extension 310 to, in turn, cause a call to be made to the user profile store 324 that contains the user profile 326. Through this call, the default graphic store 336 can be accessed and various graphics can be stored therein.

In the example system 400 of FIG. 4, storage of the imaging data is accomplished through use of the imaging extension 412. In particular, when the imaging source 102 was first accessed, the user's browser 304 can have been redirected by the content 306 downloaded into the browser to an authentication service and the user provided with an opportunity to complete an authentication procedure that identifies both the user's identity and the location of the user's personal imaging repository 320. Once the authentication procedure has been successfully completed, the browser 304 is again redirected and the user information, or at minimum the location of the user profile 326, is supplied to the business card service. With this information, the service can then access the user's personal imaging repository 320 by making a call to the imaging extension 412 to command the imaging extension to make a call to the user profile store 324 of the personal imaging repository 320. It is noted that, although use of an imaging extension is specifically identified, persons having ordinary skill in the art will appreciate that, alternatively, the service can directly call the user profile store 324. In such a case, the service can, for instance, use a collection of stubs that are configured to call various elements of the personal imaging repository 320.

It is to be noted that the graphic store 336 and/or composition store 346 can, in some arrangements, form part of or be supported by the imaging source 102. Accordingly, where the imaging source 102 comprises a local application, the stores 336, 346 may be located within memory 502 of the client device 302. Where the imaging source 102 comprises a network-based service, the stores 336, 346 may be located on one or more servers that are accessible over the network 204.

Irrespective of the location of the stores 336, 346, however, the imaging source 102 preferably stores a scaled-down version of the document, either in addition to or in exception to the original document, which the user has created and/or identified. By way of example, this scaled-down version of the document can comprise thumbnail views of the various pages of the document that will ultimately be accessed by an appropriate imaging destination 104 that is capable of printing the document. Such scaled-down versions can typically be generated by imaging sources without difficulty in that many of these sources are capable of generating print previews that comprise a "snapshot" of the document as it would appear if printed in hard copy form. Moreover, many such imaging sources permit scaling of the previews. As will be appreciated from the discussion that follows, storage of a scaled-down version of the document simplifies the printing cost estimate process that is undertaken by imaging destinations 104. Once the imaging data have been stored, flow for the session with the image source 102 is terminated.

Figure 8A:
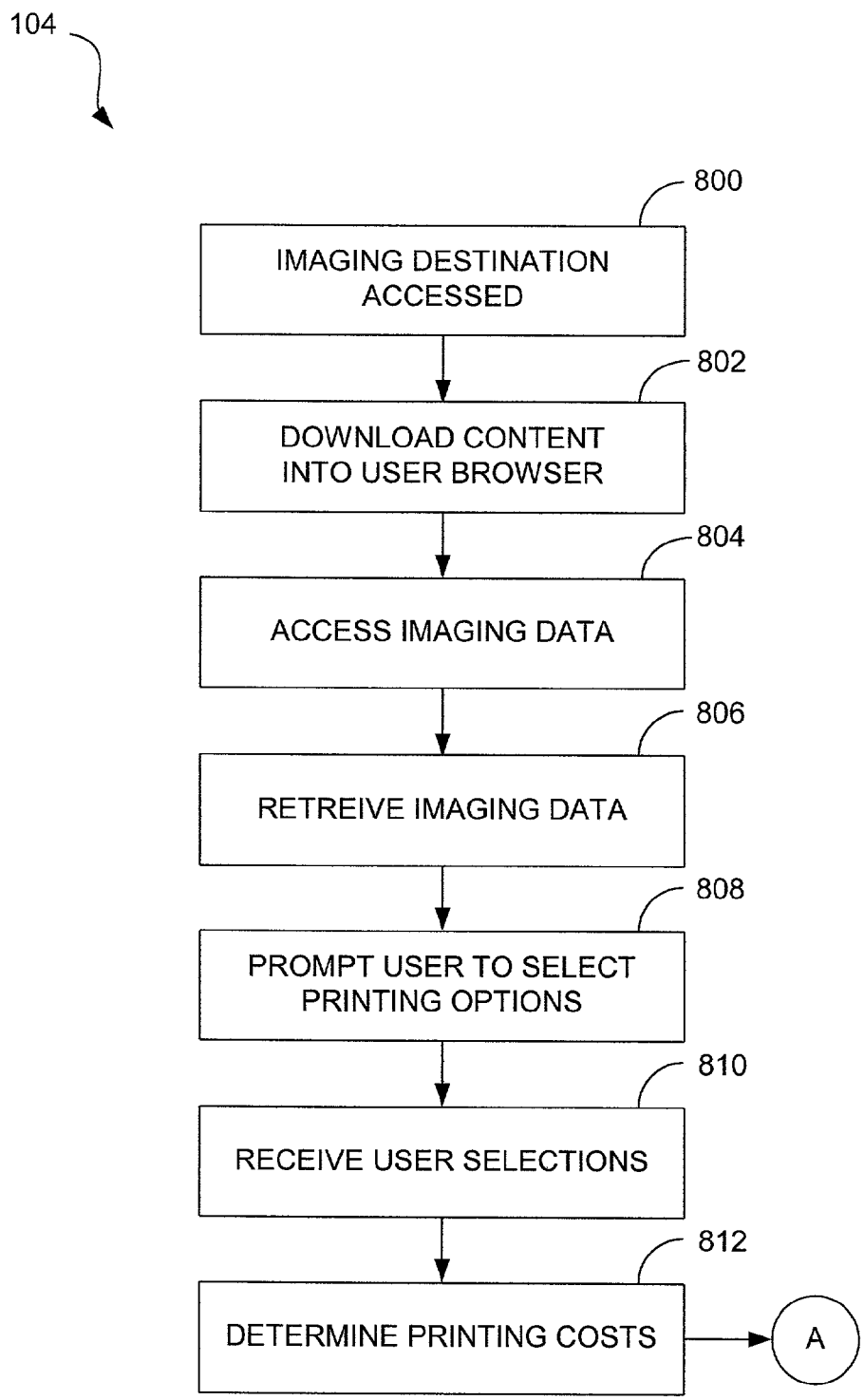
FIGS. 8A-8C provide a flow diagram illustrating an example of operation of an image destination in providing pay-for-printing services.
Figure 8B:
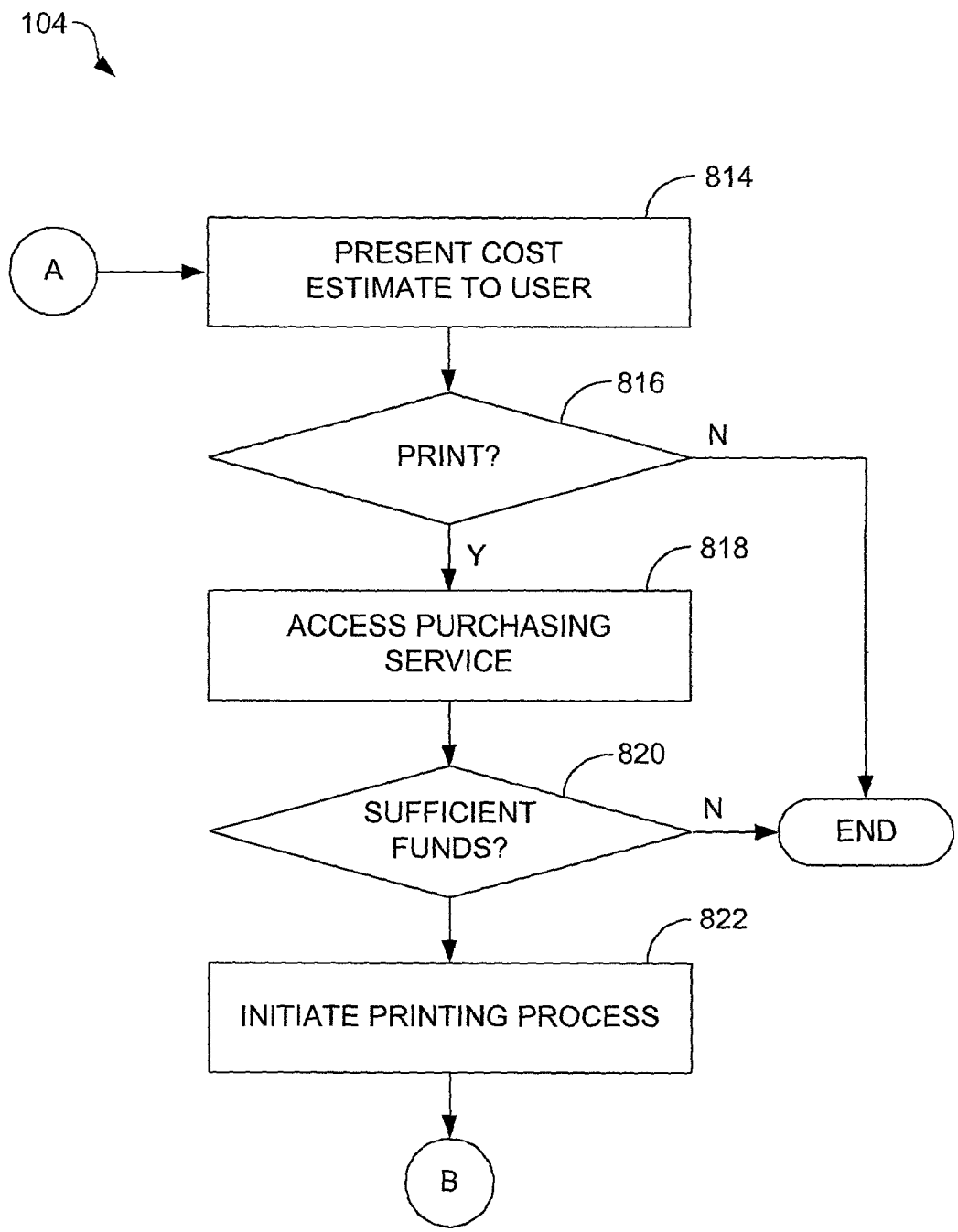
Figure 8C:
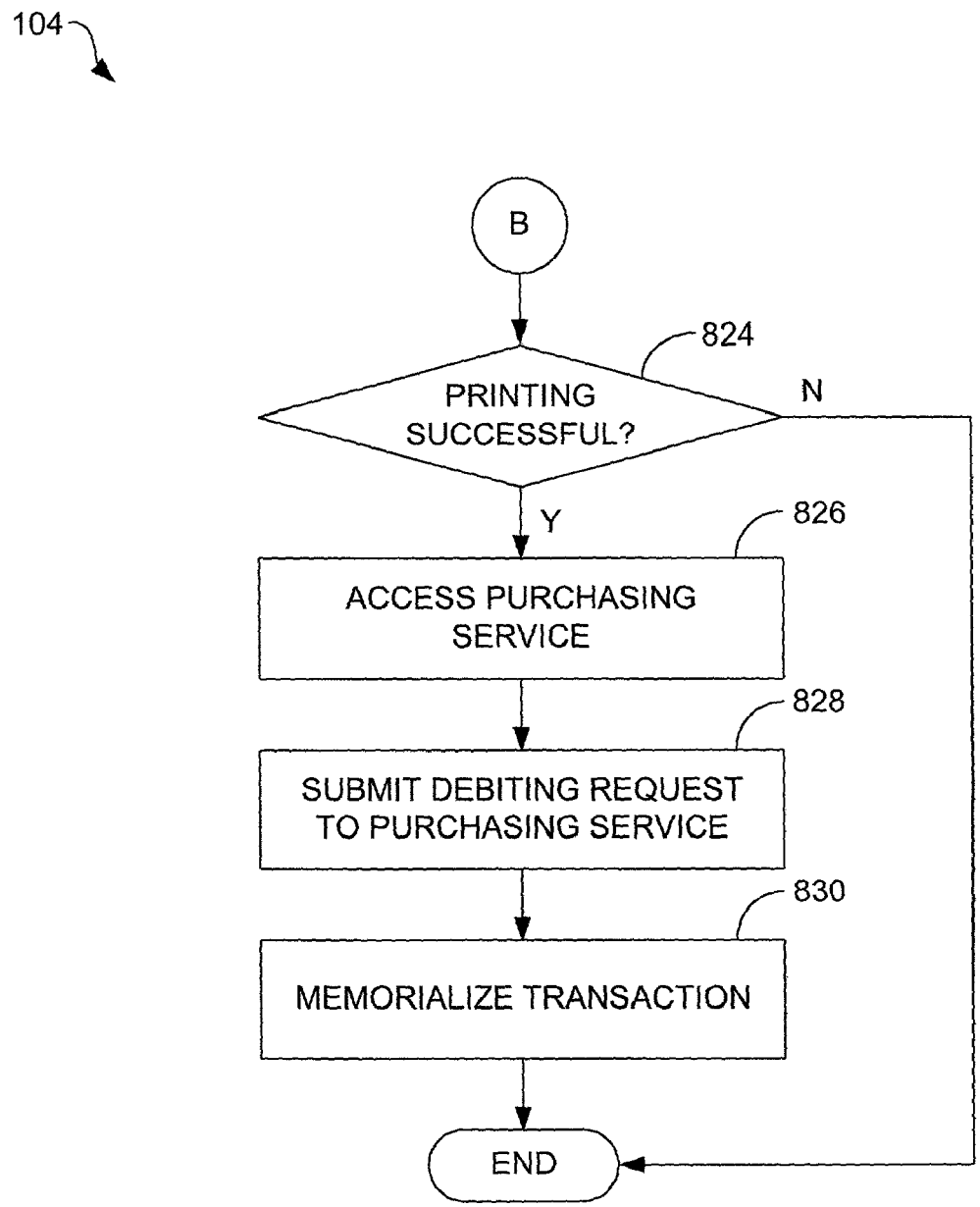

FIGS. 8A-8C provide an example of operation of an imaging destination 104 in providing pay-for-printing services to a user as well as facilitating debiting of a user account in return for the provided services. Beginning with block 800 of FIG. 8A, the imaging destination 104 is first accessed. Typically, this access is achieved by browsing to the imaging destination over a network. By way of example, the imaging destination 104 comprises a pay-for-printing service that includes a web site that is accessed via the Internet. Where the imaging source 102 comprises a network-based service, arrival at the imaging destination 103 can have been effected by selecting a "print" button from an imaging source web site.

Once the imaging destination 104 (i.e., pay-for-printing service) is accessed, it downloads content 306 into the user's browser 304, as indicated in block 802. This content 306 normally includes various text and/or graphics that are displayed to the user to facilitate interfacing between the user and the service. Where the system is arranged as shown in FIG. 3, the content 306 can also include generic access instructions 308 that call on methods of the imaging extension 310 of the browser 304 so that the user's personal imaging repository 320 can be accessed. Where the system is arranged as shown in FIG. 4, the imaging extension 418 of the imaging destination can be used to access the personal imaging repository 320. In this latter case, the imaging extension 418 knows the location of the personal imaging repository 320 from information provided to the imaging destination with, for example, a redirection address (e.g., URL).

Next, the pay-for-printing service accesses the imaging data (e.g., document) that are to be printed, as indicated in block 804. Where the imaging source 102 comprises a local application that executes on the client device 302, this access can be facilitated by entry by the user of the location of a document to be printed. Alternatively, where the imaging source 102 comprises a network-based service, the pay-for-printing service can gain access by automatic reference to the user's personal imaging repository 320 using an imaging extension 310 or 418. Assuming the user had just created and/or identified the document(s) using a network-based service, the imaging data comprises the default graphics and default composition that were stored by the network-based service.

Figure 9:
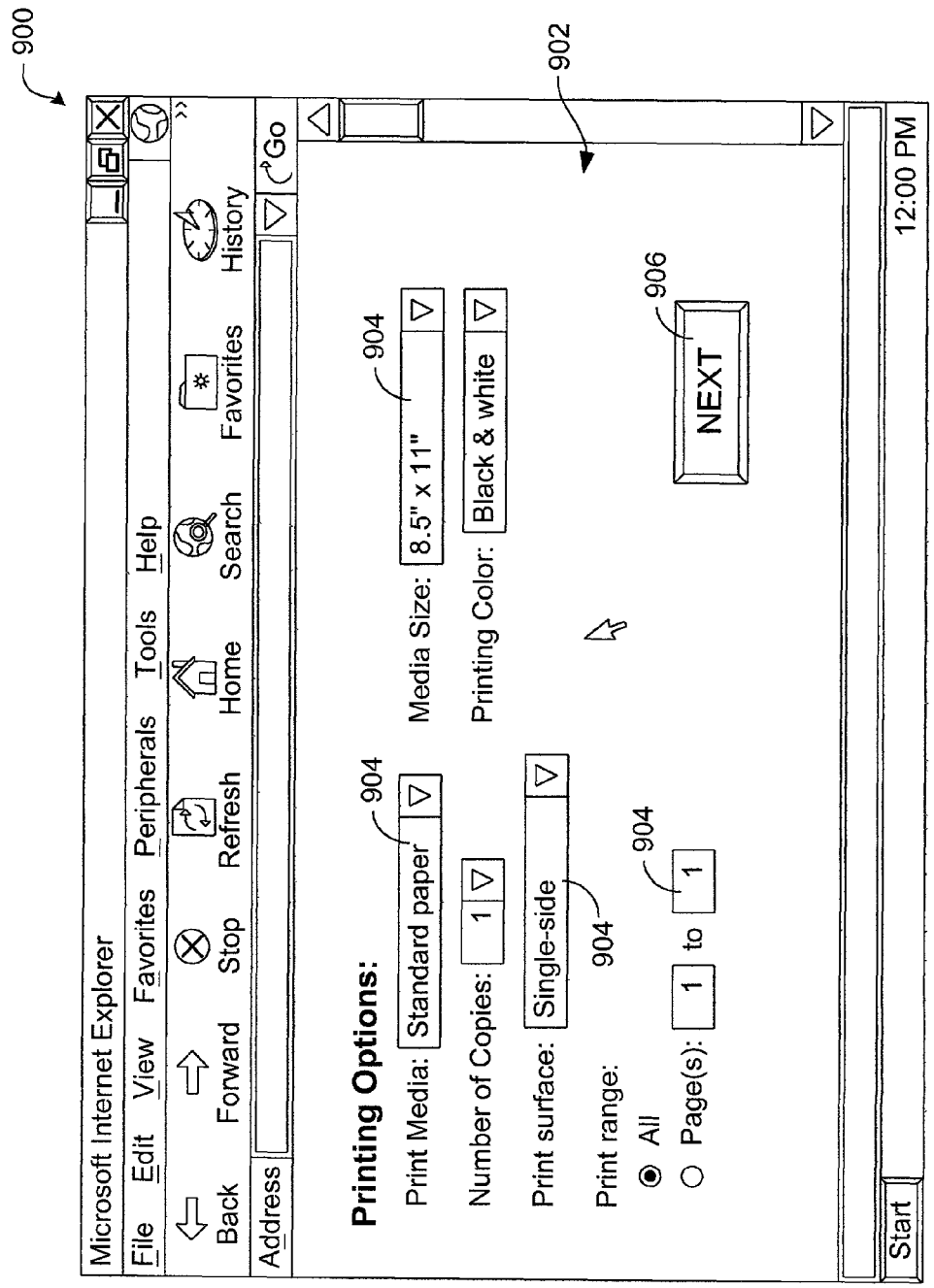
FIG. 9 is an example web page that can be used in the example of FIGS. 8A and 8B.

At this point, the pay-for-printing service retrieves the imaging data (i.e., document), as indicated in block 806. As identified above, these data typically comprise a scaled-down version of the document to be printed. For example, these data can comprise thumbnail views of the various pages of the document. Operating in this manner, the pay-for-printing service can retrieve the data more quickly than if the original document where uploaded to the service in its entirety. Once the imaging data have been retrieved, the pay-for-printing service can prompt the user to select the desired printing options, as indicated in block 808. Typically, this prompting is effected with an interface (e.g., graphical user interface (GUI)) in the form of one or more web pages that are presented to the user with the browser 304. FIG. 9 is a schematic representation of an example browser interface 900 in which an example web page 902 is shown that can be used to prompt the user for his or her selections. Although the browser interface 900 is shown as a Windows-based browser interface, it will be appreciated that substantially any browser interface could be used. Therefore, the interface may not appear as indicated in FIG. 9, particularly where the client device 302 comprises a handheld computing device such as a PDA or mobile telephone. As depicted in FIG. 9, the page 902 can include various data fields 904 in which the user can enter his or her selections. By way of example, the options provided to the user can comprise the type of print media to be used, the size of the media, the number of copies to be made, whether to print in black-and-white or color, whether to print a simplex or duplex document, etc. Once the selections are made, the user can enter the selections by selecting, for example, a "next" button 906.

With reference back to FIG. 8A, once the various selections have been entered by the user in the provided data fields (or other mechanism), the user selections can be received, as indicated in block 810. The pay-for-printing service can then determine the cost for printing in accordance with the user selections, as indicated in block 812. This determination can depend upon the nature of the document to be printed as well as the various selections that have been entered by the user. For instance, the printing cost may depend upon the number of pages of the document, print media selected, number of copies desired, whether the document is to be printed in black-and-white or color, the toner or ink coverage that will result, the time of day in which the printing is desired (e.g., peak versus off-peak hours), the amount of time the print job will require, etc.

Referring now to FIG. 8B and block 814, the pay-for-printing service can then present a cost estimate to the user. An estimate is provided in that it is not clear what the final cost of printing the document will be. For instance, if a paper jam occurs during the printing of the document, the cost of the print job, assuming the jam is fixed, may be reduced by a predetermined amount as a customer courtesy or, where the jam is not fixed and therefore prevents printing, may be voided. At this point, it can be determined whether the user would like to print the document, as indicated in decision element 816. If not, flow for the session is terminated. If so, however, the pay-for-printing service can access the purchasing service 108, as indicated in block 818. As noted above, the pay-for-printing service can learn of the location of the purchasing service 108 by referencing a URL (or other identifier or mechanism) located within the user profile 326. In addition to obtaining the location information, the pay-for-printing service can, optionally, obtain any security information that may be necessary to access the purchasing service 108 and, more particularly, the applicable user account maintained by the purchasing service. By way of example, this security information can comprise a key or other device typically used to access secure information.

Once the purchasing service 108 has been accessed, the pay-for-printing service can determine whether there are sufficient funds within the user account to pay for the printing services that the user desires, as indicated in decision element 820. If the user's funds are lacking, the flow for the session is terminated. If, however, adequate funds are available, flow continues on to block 822 at which the pay-for-printing service initiates the printing process. This initiation can comprise, for instance, transmission of the print job to a designated printing device. As mentioned above, the printing device used to generate the hard copy document can comprise a remote printing device maintained by the pay-for-print service or a printing device that is proximate to the user. In the former case, the printed document may be mailed to the user via conventional mail. In the latter case, the printing device may comprise a shared device in a public environment such as a hotel, airport, coffee shop, copy store, university copy/printing center, etc. In such a situation, it may be desirable for the pay-for-printing service to be hosted by an embedded server of the printing device (223, FIG. 2).

Continuing next to FIG. 8C and decision element 824, the pay-for-printing service can then determine whether the print job was successfully completed. This information can be obtained by the pay-for-printing service by, for instance, receiving a successful printing notification issued from the printing device. If printing is not successful, for instance a printing device jam occurred, flow is, at least temporarily, terminated and the user account is not debited. However, if printing is successful, the pay-for-printing service accesses the purchasing service 108, as indicated in block 826, and submits a debiting request that requests that the user account be debited the cost of the printing job and an appropriate account of the pay-for-printing service be credited in that amount (block 828).

Figure 10:
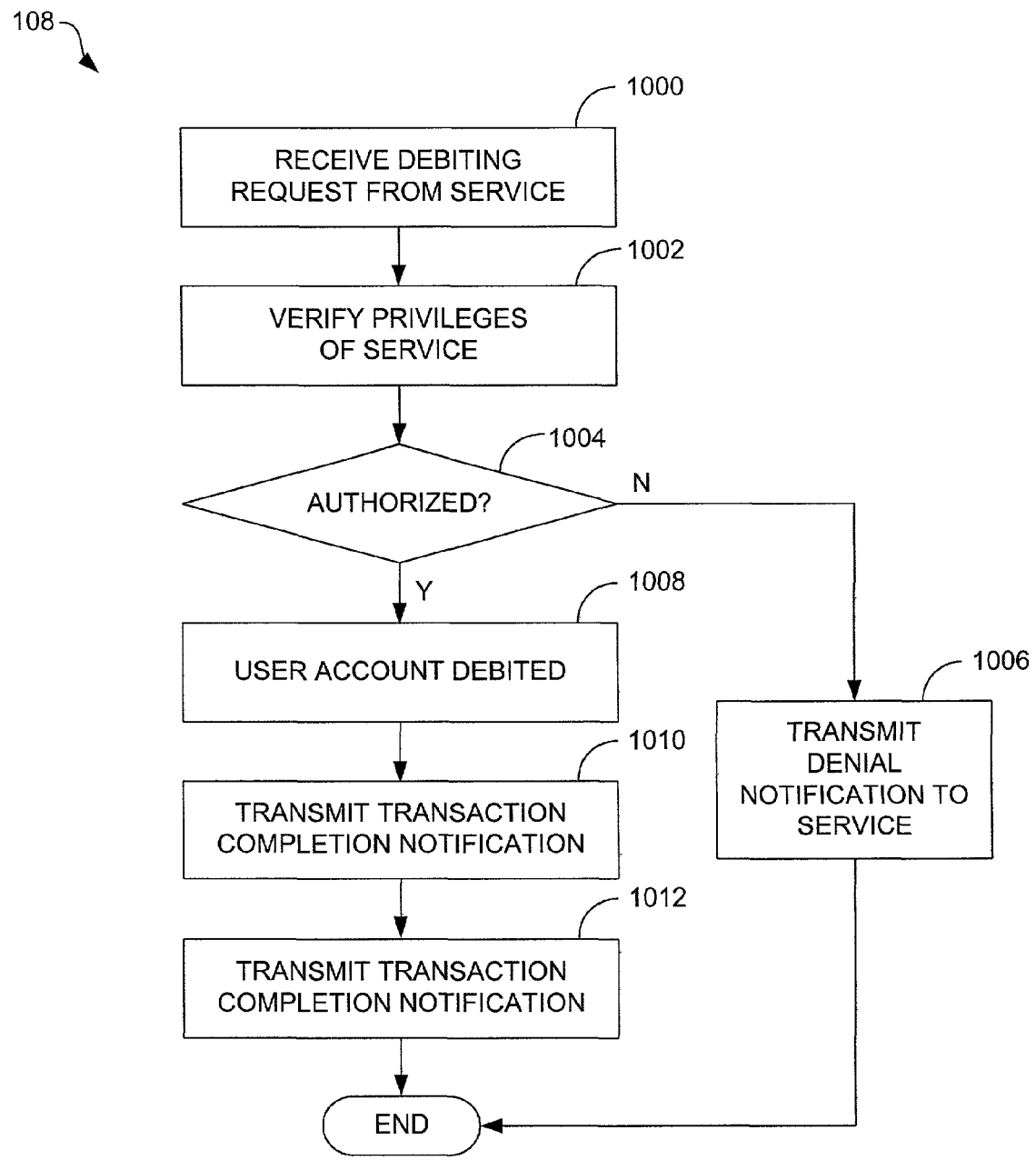
FIG. 10 is a flow diagram illustrating an example of operation of a purchasing service shown in FIGS. 1, 2, 3, and 4 in facilitating debiting of a user account.

Referring now to FIG. 10, illustrated is an example of operation of the purchasing service 108 in facilitating debiting of a user account. Beginning with block 1000, the purchasing service 108 first receives a debiting request from another service (i.e., the pay-for-printing service). Once this request is received, the purchasing service 108 verifies the privileges of the pay-for-printing service to access an account maintained by the purchasing service, as indicated in block 1002. This verification can be made with reference to security information provided by the pay-for-printing service. This security information can comprise, for example, a key of the user that, as noted above, could have been obtained by the pay-for-printing service by accessing the personal imaging repository 320, or a private key of the pay-for-printing service is used to sign the request. Persons having ordinary skill in the art will recognize that, where security is desired, many other means for providing this security (i.e., cryptographic processes) can be implemented. In addition or alternatively, the determination can be made according to the nature of the service requesting debiting. For example, the user account can be maintained such that it can only be used for payment for certain services (e.g., on campus printing).

With reference to decision element 1004, if the pay-for-printing service is unauthorized, a notification to this effect is transmitted to the pay-for-printing service, as indicated in block 1006. If, on the other hand, the pay-for-printing service is authorized, flow continues to block 1008 at which the user account is debited and the pay-for-printing service is credited the cost of the services (i.e., printing). Stated otherwise, the purchasing service 108 facilitates the transfer of funds from the user account to a pay-for-printing service account. At this point, a transaction completion notification can be transmitted to the pay-for-printing service, as indicated in block 1010, and flow for the billing session is terminated.

Returning now to FIG. 8C, the pay-for-printing service can memorialize the transaction, as indicated in block 830. This memorialization can take many different forms. By way of example, the pay-for-printing service can generate a receipt for the printing services rendered to the user. This receipt can, for instance, be printed along with the printed document so that the user can obtain a record of the pay-for-printing transaction. Alternatively, an electronic receipt can be generated for the user and stored, for instance, in the user's personal imaging repository 320, for later retrieval and/or inspection. Where the receipt is stored in the repository 320, the pay-for-print service functions as an imaging source for the imaging destination (e.g., home or office printer) used to generated a hard copy receipt.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for facilitating pay printing, comprising:
   downloading content from a web-based print service to a web browser of a user computer, the content including a user interface that is displayed to the user in the web browser;
   retrieving with the print service via a network user imaging data from at least one user store;
   determining with the print service applicable printing costs;
   initiating with the print service printing of the imaging data; and
   sending via the network from the print service to a purchasing service a request for debiting of a user account
   wherein retrieving imaging data comprises retrieving a scaled-down version of a document that provides an indication of content of the imaging data and therefore can be used to estimate the printing costs.

2. The method of claim 1, wherein the scaled-down version comprises thumbnail views of pages of the imaging data.

3. A method for facilitating pay printing, comprising:
   downloading content from a web-based print service to a web browser of a user computer, the content including a user interface that is displayed to the user in the web browser;
   retrieving with the print service via a network user imaging data from at least one user store;
   determining with the print service applicable printing costs;
   initiating with the print service printing of the imaging data; and
   sending via the network from the print service to a purchasing service request for debiting of a user account
   wherein downloading content comprises downloading generic access instructions to the web browser and wherein retrieving imaging data comprises retrieving imaging data from the at least one user store with an imaging extension that executes on the user computer, the imaging extension in response to the generic access instructions accessing the at least one user store.

4. The method of claim 3, wherein the imaging extension comprises part of the web browser.

5. The method of claim 3, wherein retrieving imaging data comprises retrieving imaging data from the at least one user store with an imaging extension of the web-based print service, the imaging extension comprising one or more application programming instructions (APIs) that receive and execute commands to access the at least one user store.

6. A method for facilitating pay printing, comprising:
   downloading content from a web-based print service to a web browser of a user computer, the content including a user interface that is displayed to the user in a web browser;
   retrieving with the print via a network user imaging data from at least one user store;
   determining with the print service applicable printing costs;
   initiating with the print service printing of the imaging data; and
   sending via the network from the print service to a purchasing service a request for debiting of a user account
   further comprising, prior to sending the debiting request: the print service identifying a location of the purchasing service.

7. The method of claim 6, wherein identifying the purchasing service location comprises the print service obtaining location information contained within a user profile stored in the at least one user store.

8. The method of claim 6, wherein obtaining location information comprises the print service obtaining a universal resource locator (URL) of the purchasing service from the at least one user store.

9. A system for facilitating pay printing, comprising:
   means provided by a print service for downloading content to a web browser of a user computer, the content including a user interface that is displayed to the user in the web browser;
   means provided by the print service for retrieving via a network user imaging data from at least one store;
   means provided by the print service for determining printing costs;
   means provided by the print service for initiating printing of the imaging data; and
   means provided by the print service for sending via the network a debiting request to a purchasing service to debit a user account for printing performed by the printing service wherein the means for accessing imaging data comprises an imaging extension comprising one or more application programming instructions (APIs).

10. The system of claim 9, wherein the means for downloading content comprise means for downloading generic access instructions to the web browser and wherein the imaging extension forms part of the web browser and accesses the at least one user store in response to the generic access instructions.

11. A printing device, comprising:
  memory including logic configured to:
    download content to a web browser of a user computer via a network, the content including a user interface,
    retrieve via the network user imaging data from at least one user store,
    determine applicable printing costs relative to user selections entered using the user interface,
    initiate printing of the imaging data, and
    send to a purchasing service via the network a request for debiting a user account
  wherein the logic is configured to download generic access instructions to the web browser and wherein the logic retrieves the imaging data from the at least one user store using an imaging extension that comprises part of the web browser, the imaging extension being configured to access the at least one user store in response to the generic access instructions.

12. The printing device of claim 11, wherein the logic is configured to retrieve imaging data from the at least one user store using an imaging extension stored on the printing device, the imaging extension comprising one or more application programming instructions (APIs) that receive and execute commands to access the at least one user store.

* * * * *

UNITED STATES PATENT AND TRADEMARK OFFICE
CERTIFICATE OF CORRECTION

| | |
|---|---|
| PATENT NO. | : 7,756,749 B2 |
| APPLICATION NO. | : 09/999450 |
| DATED | : July 13, 2010 |
| INVENTOR(S) | : Shell Sterling Simpson et al. |

It is certified that error appears in the above-identified patent and that said Letters Patent is hereby corrected as shown below:

In column 16, line 13, in Claim 3, after "service" insert -- a --.

In column 16, line 32, in Claim 6, delete "a" and insert -- the --, therefor.

In column 16, line 35, in Claim 6, after "print" insert -- service --.

Signed and Sealed this
First Day of March, 2011

David J. Kappos
*Director of the United States Patent and Trademark Office*